United States Patent [19]
Kong et al.

[11] Patent Number: 5,377,211
[45] Date of Patent: Dec. 27, 1994

[54] METHOD AND APPARATUS FOR RAMAN LASER OSCILLATION USING STIMULATED BRILLLOUIN SCATTERING

[75] Inventors: Hong Jin Kong; Yong Geun Jeon, both of Daejon, Rep. of Korea

[73] Assignee: Agency for Defense Development, Daejon, Rep. of Korea

[21] Appl. No.: 142,204

[22] Filed: Oct. 25, 1993

[30] Foreign Application Priority Data

Apr. 24, 1993 [KR] Rep. of Korea .................. 6937/1993

[51] Int. Cl.$^5$ .............................................. H01S 3/30
[52] U.S. Cl. ........................................... 372/3; 372/99
[58] Field of Search ..................... 372/3, 71, 99

[56] References Cited

U.S. PATENT DOCUMENTS

| | | | |
|---|---|---|---|
| 3,668,420 | 6/1972 | Vanderslice | 307/88.3 |
| 4,194,170 | 3/1980 | Kurnit | 372/3 |
| 4,821,272 | 4/1989 | Bruesselbach et al. | 372/3 |
| 4,868,833 | 9/1989 | Stults et al. | 372/11 |
| 4,933,943 | 6/1990 | Narhl et al. | 372/3 |
| 5,058,117 | 10/1991 | Shoshan et al. | 372/3 |
| 5,090,016 | 2/1992 | Dewhirst et al. | 372/3 |
| 5,153,887 | 10/1992 | Krapcher | 372/3 |
| 5,180,378 | 1/1993 | Kung et al. | 372/3 |
| 5,251,221 | 10/1993 | Stultz et al. | 372/3 |
| 5,258,988 | 11/1993 | Whittley | 372/3 |
| 5,265,106 | 11/1993 | Garcia et al. | 372/3 |
| 5,272,717 | 12/1993 | Stultz et al. | 372/3 |

FOREIGN PATENT DOCUMENTS

3114815A1 10/1982 Germany.

*Primary Examiner*—Rodney B. Bovernick
*Assistant Examiner*—Robert E. Wise
*Attorney, Agent, or Firm*—Darby & Darby

[57] ABSTRACT

Method and apparatus for Raman laser oscillation using stimulating Brillouin scattering as well as stimulated Raman scattering. The method comprises generation of a seed beam and condensing of the seed beam to a gas cell using the condensing lens such that part of the condensed beam is scattered by stimulated Raman scattering while the other part of the condensed beam is scattered by stimulated Brillouin scattering. The stimulated Raman scattered laser beam is outputted from a collimating lens while the stimulated Brillouin scattered laser beam returns to the condensing lens thanking for its phase conjugate characteristic. The stimulated Brillouin scattered laser beam is amplified in a section between a phase conjugate mirror and the resonance reflection mirror and condensed to the gas cell such that it is again scattered by stimulated Raman scattering in the gas cell prior to its output from the collimating lens. The phase conjugate mirror coincides with a focus of the condensing lens, and the section between the phase conjugate mirror and the resonance reflection mirror defines a Brillouin resonator.

6 Claims, 2 Drawing Sheets

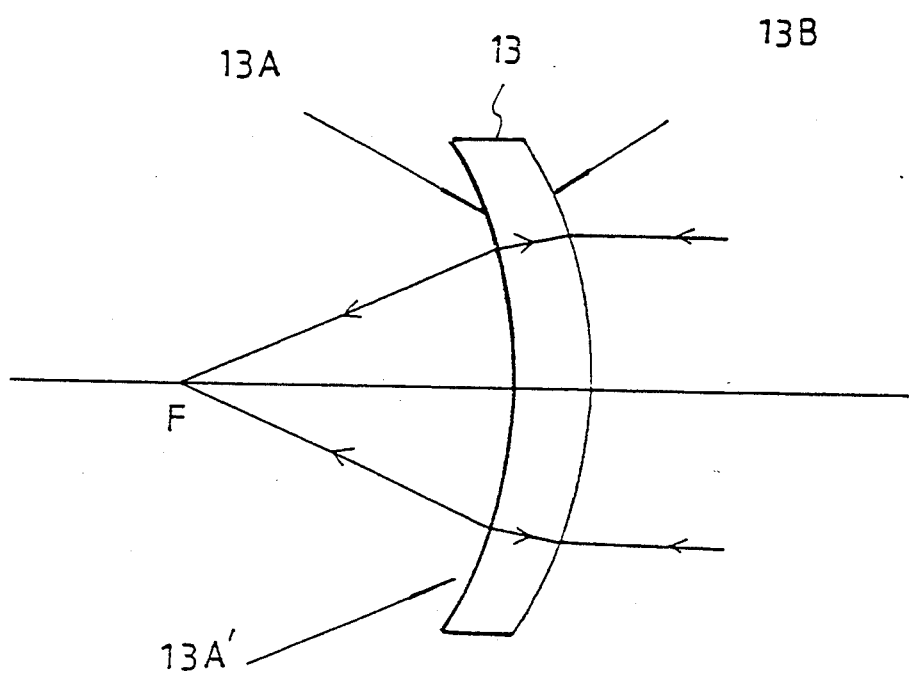
F I G. 3

METHOD AND APPARATUS FOR RAMAN LASER OSCILLATION USING STIMULATED BRILLLOUIN SCATTERING

BACKGROUND OF THE INVENTION

1. Field of the invention

The present invention relates in general to a Raman laser oscillation, and more particularly to method and apparatus for Raman laser oscillation using both stimulated Brillouin scattering and stimulated Raman scattering.

2. Description of the Prior Art

As well noted to those skilled in the art, in a Raman laser oscillator using stimulated Raman scattering, a pumping beam generated by a pumping resonator is scattered in a gas cell, thus to change the wavelength of a laser beam and to output a laser beam having a desired wavelength. Such laser oscillators using stimulated Raman scattering have been thus wide used as various industrial measuring devices.

With reference to FIG. 1, there is shown a prior art Raman laser oscillator using stimulated Raman scattering such as disclosed in U.S. Pat. No. 4,821,272. This Raman laser oscillator includes a methane gas cell 2 which is placed on the front of a laser output mirror 7 of a laser resonator such that the laser oscillator uses a wavelength changing effect of the laser beam caused by stimulated Raman scattering (SRS) generated in the gas cell 2.

In the above Raman laser oscillator, a resonance reflection mirror 6 serves to reflect a pumping beam of a pumping source (not shown). The laser output mirror 7 of the laser resonator serves to reflect, in cooperation with the reflection mirror 6, the pumping beam in the resonator, thus to amplify the pumping beam. This laser output mirror 7 is also coated with a dielectric on a surface thereof toward the surface 4A of a laser rod 4 such that it has a high reflectance for the pumping beam and reflects the pumping beam, reflected by the gas cell 2, to the gas cell 2. An optical Q-switch 5 is placed between the two mi trots 6 arid 7 and is an optical element which serves to shorten the laser pulse width but to strengthen the laser intensity and preferably uses a saturable absorber. When using the saturable absorber, the Q-switch 5 provides a pulse width of 10–20 ns. The laser rod 4 is placed between the laser output mirror 7 and the Q-switch 5, and serves to amplify the laser beam reciprocating between the two mi trots 6 and 7. When using Nd:YAG crystal as the laser rod 4, the generated laser beam has a wavelength of 1.06 $\mu$m. The laser oscillator further includes a condensing lens 3 which is placed between the gas cell 2 and the laser output mirror 7 in order to condense the laser beam generated by the laser resonator to the gas cell 2. When the pumping beam is condensed to the gas cell 2, the stimulated Raman scattering is induced by interrelation between the condensed pumping beam and molecular vibration of the gas medium molecules inside the gas cell 2, thus to change the wavelength of the pumping beam.

That is, the pumping beam is scattered by the stimulated Raman scattering is increased in its wavelength, otherwise stated, its frequency is decreased. For example, when methane gas ($CH_4$) is used as the gas medium of the gas cell 2, the wavelength 1.06 $\mu$m of the pumping beam is increased to 1.54 $\mu$m. The gaseous material or a fluid material, such as methane, in the gas cell 2 is generally named as a Raman medium. The Raman medium is generally selected from a group of methane, deuterium ($D_2$) and hydrogen ($H_2$). The laser beam, changed in its wavelength by the stimulated Raman scattering, is outputted from a collimating lens I in the form of a parallel beam.

However, it has been noted that such a prior art Raman laser oscillator using stimulated Raman scattering has the following problems.

First, the prior art Raman laser oscillator using stimulated Raman scattering has a relatively higher larger loss due to stimulated Brillouin scattering induced together with the stimulated Raman scattering in the gas cell 2. This stimulated Brillouin scattering is disclosed in detail in page 1072 of W. Kaiser & M. Maler, "Stimulated Rayleigh, Brillouin and Raman Spectroscopy" Laser Handbook, F. T. Arrecchi and E. O. Shulz—Dubols, eds., Laser Handbook, (North Holland Publishing Co., Amsterdam, 1972). This stimulated Brillouin scattering is always induced together with the stimulated Raman scattering in the gas cell 2. The stimulated Brillouin scattering is a non-linear optical phenomenon in that a laser beam is scattered by an acoustic wave generated in the Raman medium in the gas cell. The laser beam affected and scattered by the stimulated Brillouin scattering scarcely shows change of wavelength and necessarily reversely travels in an incident direction of the laser beam to the gas cell 2, that is, in the backward direction of the gas cell 2, since the laser beam scattered by the stimulated Brillouin scattering or the stimulated Brillouin scattered laser beam shows a phase conjugate characteristic. The phase conjugate characteristic of the laser beam scattered by the stimulated Brillouin scattering is disclosed in detail in B. Ya. Zel'aldrich, N. F. Piliptsky, V. V. Shkunov, "Principles of Phase Conjugation", Springer-Verag (1985). The laser beam scattered by the stimulated Brillouin scattering returns to laser output mirror 7 through the condensing lens 3 by which the laser beam was condensed to the gas cell 2. However, the laser beam scattered by the stimulated Brillouin scattering and returning to the laser output mirror 7 is mostly reflected by the laser output mirror 7 since it has a wavelength which is nearly equal to that of the pumping beam, such that it is not introduced into the laser resonator. The stimulated Brillouin scattering of the prior art Raman laser oscillator thus causes a laser output deterioration or a laser output loss. Otherwise stated, in the prior art Raman laser oscillator using the stimulated Raman scattering, the laser output mirror 7 interferes with the stimulated Brillouin scattering as well as the phase conjugate of the laser beam scattered by the stimulated Brillouin scattering, thus to serve to interfere with the laser output of the Raman laser oscillator and to cause deterioration of efficiency of the oscillator and weakening of the output laser intensity.

Second, it is not easy to achieve a desired optical alignment of optical elements of the prior art Raman laser oscillator using stimulated Raman scattering. This is caused by the fact that the prior art Raman laser oscillator should have the laser output mirror 7, and the more the number of the elements of the laser oscillator is, the more difficult the optical alignment of the elements of the laser oscillator is. When a desired precise optical alignment of the elements of the oscillator is not achieved, the laser output of the oscillator is inevitably deteriorated. On the other hand, even when the desired optical alignment of the elements of the oscillator is achieved, the alignment is apt to be distorted by bad effect given to the elements by their circumstances, such as mechanical vibration and mechanical shock, in accordance with lapse of time. In addition, such a distortion of the optical alignment of the elements intends to be in proportion to the number of the elements. Thus, it is preferred to reduce the number of the elements of the Raman laser oscillator in order to achieve and maintain the desired optical alignment of the elements of the oscillator, In this regard, the laser output and efficiency of the Raman laser oscillator using stimulated Raman scattering will be increased by additionally preferably using the stimulated Brillouin scattering induced together with the stimulated Raman scattering of the laser beam in the gas cell. In addition, reduction of the number of the elements of the Raman laser oscillator will easily achieve and maintain the desired optical alignment of the elements of the oscillator.

SUMMARY OF THE INVENTION

It is, therefore, an object of the present invention to provide a method for Raman laser oscillation in which the aforementioned problems can be overcome and which uses stimulated Raman scattering and stimulated Brillouin scattering induced together with the stimulated Raman scattering in a gas cell of a Raman laser oscillator.

It is another object of the present invention to provide apparatus for Raman laser oscillation in which the aforementioned problems can be overcome and which shows improved efficiency and improved laser output by using stimulated Raman scattering and stimulated Brillouin scattering induced together with the stimulated Raman scattering in the gas cell of the oscillator.

It is a further object of the present invention to provide apparatus for Raman laser oscillation of which a laser output mirror and a condensing lens are integrated into an optical element serving as both the laser output mirror and the condensing lens, thus to reduce the number of the elements of the Raman laser oscillator and, as a result, to easily achieve and maintain a desired optical alignment of the elements of the oscillator.

It is yet another object of the present invention to provide apparatus for Raman laser oscillation of which opposite side surfaces of a condensing lens, serving as both a conventional laser output mirror and a conventional condensing lens, is differently coated, thus to achieve the same laser output and effect as those of a conventional Raman laser oscillator.

In order to accomplish the above objects, apparatus for Raman laser oscillation in accordance with the present invention uses the stimulated Brillouin scattering as well as the stimulated Raman scattering differently from the prior art Raman laser oscillator using only the stimulated Raman scattering, thus to increase the laser output, and reduces the number of elements of the Raman laser oscillator by substituting an optical element or a condensing lens serving as both a laser output mirror and a condensing lens for a conventional output mirror and a conventional condensing lens, thus to simplify the construction of the Raman laser oscillator and to easily achieve and maintain a desired optical alignment of the elements of the oscillator.

In the present invention, the Raman laser oscillator uses the condensing lens serving as both a conventional output mirror and a conventional condensing lens in order to overcome the problems caused by the prior art Raman laser oscillator using stimulated Raman scattering. The condensing lens of this invention causes a laser beam, scattered by the stimulated Brillouin scattering induced together with the stimulated Raman scattering of the laser beam in a gas cell and showing a phase conjugate, to return to a laser resonator. This condensing lens is designed to use the phase conjugate of the laser beam scattered by the stimulated Brillouin scattering.

In addition, the condensing lens of this Raman laser oscillator serves as both a conventional output mirror and a conventional condensing lens in consideration of the fact that the desired optical alignment of the elements of the prior art oscillator, separately having the output mirror and the condensing lens, is very difficult to be achieved and maintained due to the number of optical elements.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a schematic view of a condensing lens of the Raman laser oscillator of the present invention, showing passages of laser beam transmitted through the condensing lens.

DESCRIPTION OF THE PREFERRED EMBODIMENTS

Figure 2:
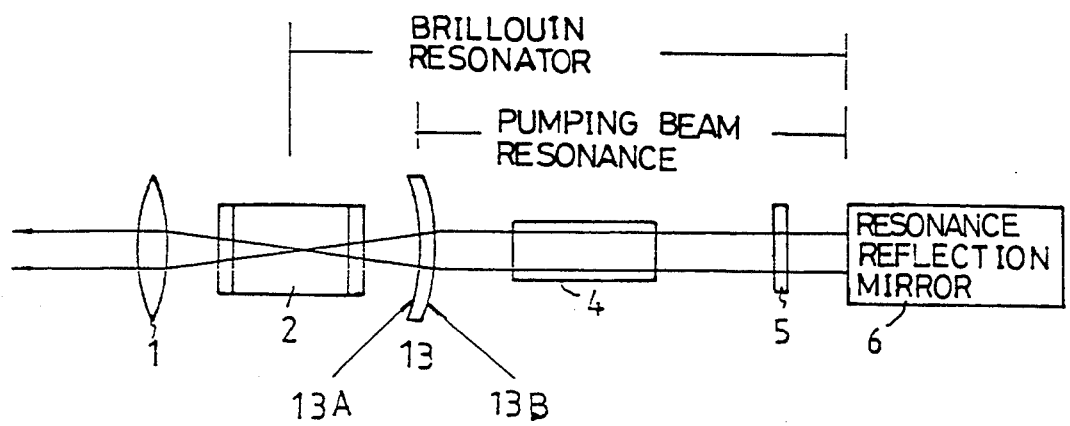
FIG. 2 is a schematic view of a Raman laser oscillator using stimulated Brillouin scattering as well as stimulated Raman scattering in accordance with a preferred embodiment of the present invention.

FIG. 2 is a schematic view of a Raman laser oscillator using stimulated Brillouin scattering as well as stimulated Raman scattering in accordance with a preferred embodiment of the present invention, and FIG. 3 is a schematic view of a condensing lens of the Raman laser oscillator, showing passages of laser beam transmitted through the condensing lens. The condensing lens 13 used in the Raman laser oscillator of this invention is a conventional lens and designed to serve as both a conventional output mirror 7 and a conventional condensing lens 3. A concave surface 13A of this condensing lens 13 has a dichroic mirror coating 13A'.

Figure 1:
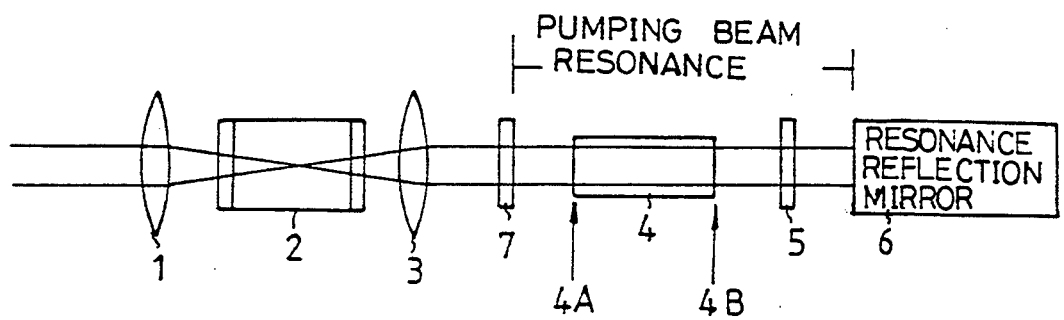
FIG. 1 is a schematic view of a prior art Raman laser oscillator using stimulated Raman scattering.

In operation of the Raman laser oscillator of this invention, the seed beam is formed in the same manner as the prior art Raman laser oscillator. However, a convex surface 13B of the condensing lens 13 serves as the laser output lens 7 of the prior art Raman laser oscillator using stimulated Raman scattering of FIG. 1. In the Raman laser oscillator of this invention, a seed laser reciprocates between a resonance reflection mirror 6 and the convex surface 13B of the condensing lens 13 such that it is amplified and generates the seed beam which induces the stimulated Brillouin scattering in a gas cell 2. Otherwise stated, the section between the resonance reflection mirror 6 and the convex surface 13B of the condensing lens 13 serves as the pumping beam resonator of the prior art Raman laser oscillator using stimulated Raman scattering. The amplified pumping beam $\lambda o$ is condensed to the gas cell 2 by the condensing lens 13, The pumping beam $\lambda o$ condensed to the gas cell 2 interrelates with the molecular vibration of the gaseous Raman medium in the gas cell 2 and is affected and scattered by the stimulated Raman scattering as well as by the stimulated Brillouin scattering. Alike the stimulated Raman scattering, the stimulated Brillouin scattering is a non-linear optical phenomenon in that the laser beam is scattered by an acoustic wave generated in the Raman medium in the gas cell 2. The laser beam scattered by the stimulated Brillouin scattering or a stimulated Brillouin scattered laser beam scarcely shows change of wavelength and necessarily reversely travels in an incident direction of the pumping beam to the concave surface 13A of the condensing lens 13, that is, in the backward direction of the gas cell 2, since this stimulated Brillouin scattered laser beam shows a phase conjugate characteristic.

On the other hand, part of the laser beam λ1 scattered by the stimulated Raman scattering or a stimulated Raman scattered laser beam travels in the backward direction, that is, the direction toward the condensing lens 13, and the other part of the stimulated Raman scattered laser beam λ1 travels in the forward direction, that is, the direction toward a collimating lens 1. Here, the laser beam λ1 travelling in the forward direction toward the collimating lens 1 is outputted from the collimating lens 1 in the form of parallel beam. On the contrary, about 99% of the laser beam λ1 travelling in the backward direction toward the condensing lens 13 is reflected by the concave surface 13A of the condensing lens 13 and, thereafter, outputted from the collimating lens 1 in the form of parallel beam. In this case, the pressure of gaseous Raman medium in the gas cell 2 should be optimally controlled in order to maximize the output energy of the Raman laser beam having the wavelength λ1.

Meanwhile, the stimulated Brillouin scattered laser beam λo scarcely showing change of wavelength necessarily reversely travels in the incident direction of the pumping beam to the concave surface 13A of the condensing lens 13 since it shows the phase conjugate characteristic. Here, since the condensing lens 13 is coated with a dielectric on its concave surface 13A, almost all (about 95%) the laser beam λo is transmitted through the condensing lens 13. The stimulated Brillouin scattered laser beam λo transmitted through the condensing lens 13 is reflected by the resonance reflection mirror 6 such that it is condensed to the gas cell 2 through the convex surface 13B of the condensing lens 13. In this case, since the laser beam scattered by the stimulated Brillouin scattering shows the phase conjugate characteristic, it exactly returns to the resonance reflection mirror 6 from the focus F of the condensing lens 13. That is, the focus F of the condensing lens 13 serves as a phase conjugate mirror. As a result, a Brillouin resonator is prepared between the phase conjugate mirror, provided by the stimulated Brillouin scattering, and the resonance reflection mirror 6, thus to oscillate an intense laser beam. In the prior art Raman laser oscillator using only stimulated Raman scattering, the process corresponding to the above process concerning with the stimulated Brillouin scattering is regarded as a loss process. However, the Raman laser oscillator of the present invention uses the stimulated Brillouin scattering as well as stimulated Raman scattering, thus to remarkably improve the laser output.

If described briefly, the stimulated Brillouin scattering causing an output loss of the prior art Raman laser oscillator using only stimulated Raman scattering is used for increasing the intensity of the pumping beam of the present invention, thus to totally improve the laser output of the laser oscillator.

The laser beam, scattered by the stimulated Brillouin scattering and amplified by the laser resonator, and condensed to the gas cell 2 by the condensing lens 13, is scattered by he stimulated Raman scattering in the gas cell 2 and, thereafter, outputted from the collimating lens 1 in the form of a parallel beam.

The Raman laser oscillator of the present invention repeats the aforementioned process until it is stopped. Since the laser beam, scattered by the stimulated Brillouin scattering, shows the phase conjugate, the laser beam which is scattered by the stimulated Brillouin scattering and amplified by a laser resonator shows a good condensability and causes improvement of the laser output of the laser oscillator.

The Raman laser oscillator using stimulated Brillouin scattering as well as stimulated Raman scattering according to the present invention is preferably used as various measuring devices, such as distance measuring devices and laser remote sensing devices. Of course, it is possible to apply the method of laser oscillation using the stimulated Brillouin scattering according to this invention to preparation of laser oscillators used in other fields.

In the present invention, it is the most important point that the laser beam scattered by the stimulated Brillouin scattering in the gas cell should return to the resonance reflection mirror of the resonator. In this regard, the Raman laser oscillator according to the aforementioned embodiment of this invention preferably uses the condensing lens of which the radius of curvature is equal to its focus, However, please note that the present invention involves a technique for transmitting almost all the laser beam, scattered by the stimulated Brillouin scattering in the gas cell, to a laser resonator with change of the construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for Raman laser oscillation using stimulating Brillouin scattering comprising the steps of:
   a) generating a seed beam by both a convex surface of a condensing lens and a resonance reflection mirror;
   b) condensing said seed beam to a gas cell by said condensing lens such that part of the condensed beam in said gas cell is scattered by stimulated Raman scattering to be a stimulated Raman scattered laser beam while the other part of said condensed beam is scattered by stimulated Brillouin scattering to be a stimulated Brillouin scattered laser beam;
   c) outputting part of said stimulated Raman scattered laser beam from a collimating lens and returning the other part of said stimulated Raman scattered laser beam to said condensing lens, while returning said stimulated Brillouin scattered laser beam to a concave surface of said condensing lens thanking for a phase conjugate characteristic of said stimulated Brillouin scattered laser beam;
   d) condensing said stimulated Brillouin scattered laser beam, amplified in a section between a phase conjugate mirror and said resonance reflection mirror, to said gas cell by said condensing lens such that the stimulated Brillouin scattered and amplified laser beam is again scattered by stimulated Raman scattering in said gas cell; and e) outputting the stimulated Raman scattered laser beam from said collimating lens.

2. The method for Raman laser oscillation according to claim 1, wherein said phase conjugate mirror coincides with a focus of said condensing lens, and said section between the phase conjugate mirror and the resonance reflection mirror defines a Brillouin resonator.

3. The method for Raman laser oscillation according to claim 1, wherein in the step d), the stimulated Raman scattered laser beam travelling to said condensing lens is mostly reflected by said condensing lens to said gas cell, and the stimulated Brillouin scattered laser beam travelling to said concave surface of the condensing lens is mostly transmitted through said condensing lens, and said step d) is continuously repeated after generation of said seed beam.

4. Apparatus for Raman laser oscillation using stimulated Brillouin scattering comprising:

means for generating a seed beam using a convex surface of a condensing lens and a resonance reflection mirror;

beam scattering means, said scattering means condensing said seed beam to a gas cell using said condensing lens such that part of the condensed beam in said gas cell is scattered by stimulated Raman scattering to be a stimulated Raman scattered laser beam while the other part of said condensed beam is scattered by stimulated Brillouin scattering to be a stimulated Brillouin scattered laser beam;

a Brillouin resonator causing part of said stimulated Raman scattered laser beam to be outputted from output means and returning the other part of said stimulated Raman scattered laser beam to said condensing lens, and returning said stimulated Brillouin scattered laser beam to a concave surface of said condensing lens thanking for a phase conjugate characteristic of said stimulated Brillouin scattered laser beam; and said output means for outputting said stimulated Raman scattered laser beam.

5. The apparatus for Raman laser oscillation according to claim 4, wherein said Brillouin resonator comprises:

said resonance reflection mirror;

a Q-switch placed on the front of said resonance reflection mirror;

said condensing lens for condensing a laser beam;

a laser rod placed between said resonance reflection mirror and said Q-switch; and a phase conjugate mirror placed on a focus of said condensing lens.

6. The apparatus for Raman laser oscillation according to claim 5, wherein said condensing lens includes:

said convex surface;

said concave surface, a radius of gyration of said concave surface being equal to said focus of said condensing lens; and a dichroic mirror coating coated on said concave surface, said coating reflecting almost all said stimulated Raman scattered laser beam travelling to said condensing lens but transmitting almost all said stimulated Brillouin scattered laser beam.

* * * * *

UNITED STATES PATENT AND TRADEMARK OFFICE
CERTIFICATE OF CORRECTION

PATENT NO. : 5,377,211
DATED : December 27, 1994
INVENTOR(S) : Hong Jin KONG and Yong Geun JEON It is certified that error appears in the above-indentified patent and that said Letters Patent is hereby corrected as shown below:

Title page, item: [54], change "BRILLLOUIN" to --BRILLOUIN--.
   Col. 1, line 4, change "BRILLLOUIN" to --BRILLOUIN--.

Signed and Sealed this

Seventh Day of March, 1995

Attest:

BRUCE LEHMAN

Attesting Officer     Commissioner of Patents and Trademarks